US005972050A

United States Patent [19]

Wiesenfeldt et al.

[11] Patent Number: 5,972,050

[45] Date of Patent: Oct. 26, 1999

[54] DYE MIXTURES CONTAINING POLYAZO DYES AND CI SULPHUR BLACK 1 DYE

[75] Inventors: Matthias Wiesenfeldt, Dannstadt-Schauernheim; Johannes Peter Dix, Weisenheim; Rolf Streicher, Worms; Manfred Herrmann, Ludwigshafen; Gunther Lamm, Hassloch, all of Germany

[73] Assignee: BASF Aktiengesellschaft, Ludwigshafen, Germany

[21] Appl. No.: 09/147,182

[22] PCT Filed: Jun. 17, 1997

[86] PCT No.: PCT/EP97/03136

§ 371 Date: Oct. 26, 1998

§ 102(e) Date: Oct. 26, 1998

[87] PCT Pub. No.: WO98/00465

PCT Pub. Date: Jan. 8, 1998

[30] Foreign Application Priority Data

Jul. 1, 1996 [DE] Germany ........................... 196 26 318

[51] Int. Cl.[6] ............................. C09B 67/00; D06P 3/32; D06P 1/39

[52] U.S. Cl. ........................................ 8/640; 8/642; 8/641

[58] Field of Search ................................ 8/642, 640, 641

[56] References Cited

U.S. PATENT DOCUMENTS

| | | |
|---|---|---|
| 4,479,906 | 10/1984 | Zeidler et al. . |
| 4,717,389 | 1/1988 | Seitz . |
| 4,717,390 | 1/1988 | Dien . |
| 4,816,034 | 3/1989 | Bhatt et al. . |
| 5,007,941 | 4/1991 | Martinelli et al. . |
| 5,152,801 | 10/1992 | Altermatt et al. . |
| 5,240,466 | 8/1993 | Bauer et al. . |
| 5,486,213 | 1/1996 | Moser et al. . |
| 5,834,602 | 11/1998 | Lamm et al. . |

FOREIGN PATENT DOCUMENTS

| | | |
|---|---|---|
| 0 42 922 | 1/1982 | European Pat. Off. . |
| 433229 | 6/1991 | European Pat. Off. . |
| 2206357 | 6/1974 | France . |
| 19530176 | 2/1997 | Germany . |
| 195 48 785 | 7/1997 | Germany . |
| 2170229 | 7/1986 | United Kingdom . |

*Primary Examiner*—Margaret Einsmann
*Attorney, Agent, or Firm*—Oblon, Spivak, McClelland, Maier & Neustadt, P.C.

[57] ABSTRACT

Mixtures comprise the dye of the formula I (I)

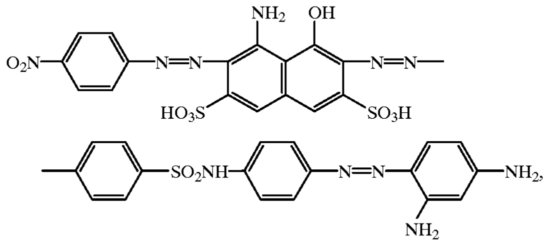

the dye C.I. Sulphur Black 1 (53 185), at least one disazo dye of the formula II (II)

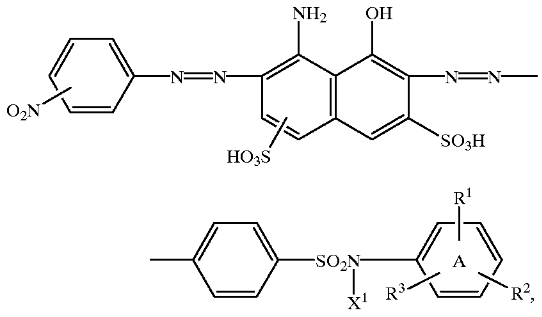

where the ring A, $X^1$, $R^1$, $R^2$ and $R^3$ are each as defined in the description part, and at least one polyazo dye of the formula III (III)

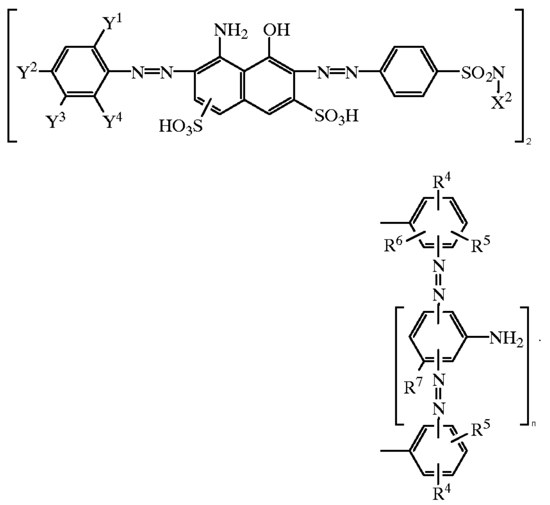

7 Claims, No Drawings

DYE MIXTURES CONTAINING POLYAZO DYES AND CI SULPHUR BLACK 1 DYE

DESCRIPTION

The present invention relates to novel dye mixtures comprising the dye of the formula I (I)

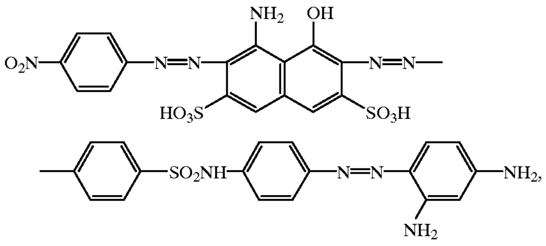

the dye C.I. Sulphur Black 1 (53 185), at least one disazo dye of the formula II (II)

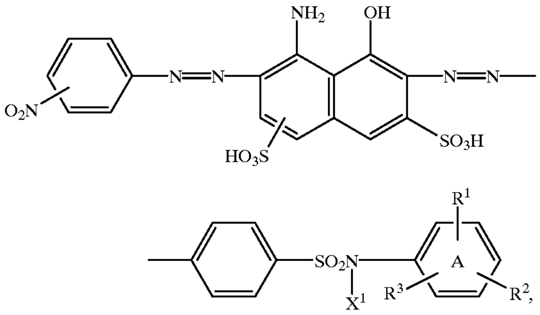

where ring A may be benzofused, $X^1$ is hydrogen or $C_1$–$C_4$-alkyl, $R^1$ is hydrogen, $C_1$–$C_4$-alkyl, halogen, carboxyl, $C_1$–$C_4$-alkoxycarbonyl or hydroxysulfonyl, $R^2$ is hydrogen, $C_1$–$C_4$-alkyl, halogen, carboxyl or $C_1$–$C_4$-alkoxycarbonyl or $R^1$ and $R^2$ are together a radical of the formula $L^1$—$NZ^1$—CO, where $L^1$ is methylene or carbonyl and $Z^1$ is $C_1$–$C_4$-alkyl, unsubstituted or $C_1$–$C_4$-alkoxy-substituted, or unsubstituted or $C_1$–$C_4$-alkyl- or $C_1$–$_4$-alkoxy-substituted phenyl, and $R^3$ is hydrogen, $C_1$–$C_4$-alkyl, hydroxyl, $C_1$–$C_4$-alkoxy, phenoxy, $C_1$–$C_4$-alkanoyloxy or benzoyloxy, and at least one polyazo dye of the formula III (III)

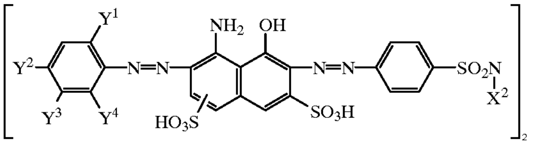

-continued

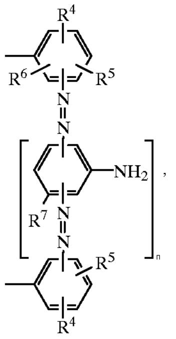

where n is 0 or 1, $Y^1$ is hydrogen, hydroxysulfonyl, pyrrolidinylsulfonyl, piperidinylsulfonyl, morpholinylsulfonyl or a radical of the formula $SO_2$-Alk, $SO_2$—Ar, $SO_2$—$N(Alk)_2$, $SO_2$—N(Alk)Ar, $SO_2$—OAr, $SO_2$—$C_2H_4$—Q, $SO_2$—CH═$CH_2$, $SO_2$—$CH_2CH$═$CH_2$, CO—Ar,

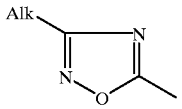

or

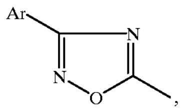

$Y^2$ is nitro, a radical of the formula $SO_2$—NHAr or the radical $Y^1$, $Y^3$ is hydrogen, hydroxysulfonyl, pyrrolidinylsulfonyl, piperidinylsulfonyl, morpholinylsulfonyl or a radical of the formula $SO_2$-Alk, $SO_2$—$N(Alk)_2$, $SO_2$—NHAlk, $SO_2$—$CH_2COOH$, $SO_2$—$C_2H_4$—Q, $SO_2$—CH═$CH_2$, $SO_2$—$CH_2CH$═$CH_2$, CO—Ar or CO—NHAlk or $Y^3$ and $Y^2$ are together a radical of the formula $L^2$—$NZ^2$—CO or $L^2$—O—CO, $Y^4$ is hydrogen or $Y^4$ and $Y^3$ are together a radical of the formula $L^2$—$NZ^2$—CO, $X^2$ is hydrogen or $C_1$–$C_4$-alkyl, $R^4$ is hydrogen, $C_1$–$C_4$-alkyl, halogen, carboxyl, $C_1$–$C_4$-alkoxycarbonyl or hydroxysulfonyl, $R^5$ is hydrogen, $C_1$–$C_4$-alkyl, halogen, carboxyl or $C_1$–$C_4$-alkoxycarbonyl or $R^2$ and $R^1$ are together a radical of the formula $L^2$—$NZ^2$—CO, $R^6$ is hydrogen, hydroxyl, $C_1$–$C_4$-alkoxy, $C_1$–$C_4$-alkanoyloxy or benzoyloxy, $R^7$ is hydrogen, amino or hydroxyl, Alk is $C_1$–$C_8$-alkyl, with or without interruption by from one to three oxygen atoms in ether function or by a sulfur atom or by a sulfonyl group and with or without substitution by hydroxyl, $C_1$–$C_4$-alkanoyloxy, benzoyloxy, sulfato, halogen, cyano, carboxyl or phenyl, Ar is phenyl, which is unsubstituted or substituted by $C_1$–$C_4$-alkyl, $C_1$–$C_4$-alkoxy, halogen, carboxyl, $C_1$–$_4$-alkanoylamino or hydroxysulfonyl, $L^2$ is methylene or carbonyl, $Z^2$ is hydrogen, naphthyl, $C_5$–$_8$-cycloalkyl or a radical of the formula Alk or Ar and Q is hydroxyl or an alkali detachable group, and to their use for dyeing natural or synthetic substrates.

The dye of the formula I has application defects on leather. More particularly, its penetration is poor.

It is an object of the present invention to provide novel dye mixtures which comprise the dye of formula I and are free of the abovementioned disadvantage.

We have found that this object is achieved by the initially defined dye mixtures.

Any alkyl appearing in the abovementioned formulae II and III may be straight-chain or branched.

In any substituted alkyl appearing in the abovementioned formulae, the number of substituents is generally one or two.

Any alkyl appearing in the abovementioned formula III with interruption by oxygen in ether function is preferably interrupted by one or two oxygen atoms in ether function.

In any substituted phenyl appearing in the abovementioned formulae, the number of substituents is generally from one to three.

$R^4$, $R^5$, $X^2$, $Y^1$, $Y^2$, $Y^3$ and $Y^4$ each occur twice in the abovementioned formula III. The two meanings for each radical are independent and can be identical to or different from each other.

If, in the formula III, $Y^2$ and $Y^3$ or $Y^3$ and $Y^4$ are together a radical of the formula $L^2$—$NZ^2$—CO, this radical can be attached to the ring positions of $Y^2$, $Y^3$ or $Y^4$ via $L^2$ or CO.

$R^1$, $R^2$, $R^3$, $R^4$, $R^5$, $X^1$, $X^2$, $Z^1$ and Alk are each for example methyl, ethyl, propyl, isopropyl, butyl, isobutyl, sec-butyl or tert-butyl.

$Z^1$ may also be for example 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxybutyl, 2- or 3-butoxypropyl, 2- or 4-methoxybutyl, 2- or 4-ethoxybutyl, 2- or 4-propoxybutyl, 2- or 4-butoxybutyl, phenyl, 2-, 3- or 4-methylphenyl, 2,4-dimethylphenyl, 2-, 3- or 4-methoxyphenyl or 2,4-dimethoxyphenyl.

Alk is for example pentyl, isopentyl, neopentyl, tert-pentyl, hexyl, 2-methylpentyl, heptyl, 1-ethylpentyl, octyl, 2-ethylhexyl, isooctyl (isooctyl is a trivial name for the oxo process alcohol—cf. Ullmann's Encyclopedia of Industrial Chemistry, 5th Edition, Vol. A 1, pages 290 to 293, and also Vol. A 10, pages 284 and 285), 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- or 4-butoxybutyl, 4,8-dioxadecyl, 3,6,9-trioxadecyl, 3,6,9-trioxaundecyl, 2-methylthioethyl, 2-ethylthioethyl, 2- or 3-methylthiopropyl, 2- or 3-ethylthiopropyl, 2- or 4-methylthiobutyl, 2- or 4-ethylthiobutyl, 2-methylsulfonylethyl, 2-ethylsulfonylethyl, 2- or 3-methylsulfonylpropyl, 2- or 3-ethylsulfonylpropyl, 2- or 4-methylsulfonylbutyl, 2- or 4-ethylsulfonylbutyl, chloromethyl, 2-chloroethyl, 2- or 3-chloropropyl, benzyl, 1- or 2-phenylethyl, 3-benzyloxypropyl, 2-hydroxyethyl, 2- or 3-hydroxypropyl, cyanomethyl, 2-cyanoethyl, 2- or 3-cyanopropyl, 2-acetyloxyethyl, 2- or 3-acetyloxypropyl, 2-isobutyryloxyethyl, 2- or 3-isobutyryloxypropyl, carboxylmethyl, 2-carboxylethyl, 2- or 3-carboxylpropyl, 2-sulfatoethyl or 2- or 3-sulfatopropyl.

$R^1$, $R^2$, $R^4$ and $R^5$ are each for example fluorine, chlorine, bromine, methoxycarbonyl, ethoxycarbonyl, propoxycarbonyl, isopropoxycarbonyl or butoxycarbonyl.

Ar is for example phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,4-dimethylphenyl, 2-, 3- or 4-methoxyphenyl, 2-, 3- or 4-ethoxyphenyl, 2-, 3- or 4-isobutoxyphenyl, 2,4-dimethoxyphenyl, 2-, 3- or 4-formylaminophenyl, 2-, 3- or 4-acetylaminophenyl, 2-, 3- or 4-propionylaminophenyl, 2-, 3- or 4-chlorophenyl, 2-, 3- or 4-carboxyphenyl or 2-, 3- or 4-hydroxysulfonylphenyl.

$Z^2$ is for example cyclopentyl, cyclohexyl, cycloheptyl or cyclooctyl.

$R^3$ and $R^6$ are each for example methoxy, ethoxy, propoxy, isopropoxy, butoxy, isobutoxy, sec-butoxy, formyloxy, acetyloxy, propionyloxy, butyryloxy or isobutyryloxy.

Q is hydroxyl or an alkali detachable group. Examples of such groups are chlorine, bromine, $C_1$–$C_4$-alkylsulfonyl, phenylsulfonyl, $OSO_3H$, $SSO_3H$, OP(O) $(OH)_2$, $C_1$–$C_4$-alkylsulfonyloxy, phenylsulfonyloxy, $C_1$–$C_4$-alkanoyloxy, $C_1$–$C_4$-dialkylamino or a radical of formula

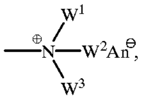 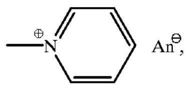

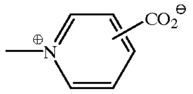 or 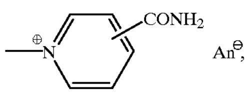

where $W^1$, $W^2$ and $W^3$ are each independently of the others $C_1$–$C_4$-alkyl or benzyl and $An^{\ominus}$ is in each case one equivalent of an anion. Examples of suitable anions include fluoride, chloride, bromide, iodide, mono-, di- or trichloroacetate, methylsulfonate, phenylsulfonate or 2- or 4-methylphenylsulfonate.

$Y^1$ is for example N-phenyl-N-methylsulfamoyl, N-phenyl-N-ethylsulfamoyl, N-phenyl-N-propylsulfamoyl, N-phenyl-N-butylsulfamoyl, 3-methyl-, 3-ethyl-, 3-propyl-, 3-butyl- or 3-phenyl-1,2,4-oxadiazol-5-yl, phenoxysulfonyl, 2-, 3- or 4-methylphenoxysulfonyl, phenylsulfonyl, 2-, 3- or 4-methylphenylsulfonyl or 2,3-, 2,4-, 2,5-, 2,6-, 3,4- or 3,5-dimethylphenylsulfonyl.

$Y^1$ and $Y^3$ are each for example dimethylsulfamoyl, diethylsulfamoyl, dipropysulfamoyl, dibutylsulfamoyl, N-methyl-N-ethylsulfamoyl, bis(2-hydroxyethyl)sulfamoyl, bis(carboxylmethyl)sulfamoyl, bis(2-carboxyethyl) sulfamoyl, methylsulfonyl, ethylsulfonyl, propylsulfonyl, isopropylsulfonyl, butylsulfonyl, 2-hydroxyethylsulfonyl, 2-chloroethylsulfonyl, 2-sulfatoethylsulfonyl, benzoyl-, 2-, 3- or 4-methylbenzoyl or 2,3-, 2,4-, 2,5-, 2,6-, 3,4- or 3,5-dimethylbenzoyl.

$Y^3$ is for example methylsulfamoyl, ethylsulfamoyl, propylsulfamoyl, isopropylsulfamoyl, butylsulfamoyl, 2-hydroxyethylsulfamoyl, carboxymethylsulfamoyl, 2-carboxyethylsulfamoyl, methylcarbamoyl, ethylcarbamoyl, propylcarbamoyl, isopropylcarbamoyl, butylcarbamoyl, 2-hydroxyethylcarbamoyl, carboxymethylcarbamoyl or 2-carboxyethylcarbamoyl.

$Y^2$ is for example phenylsulfamoyl or 2-, 3- or 4-methylphenylsulfamoyl.

Radicals
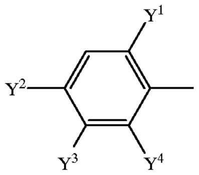
conform for example to the formula
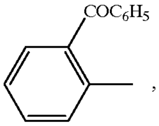,
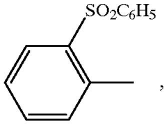,
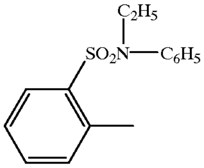,
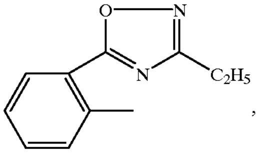,
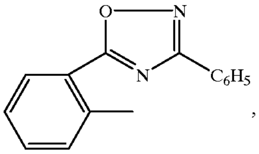,
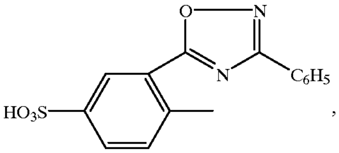,
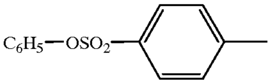,
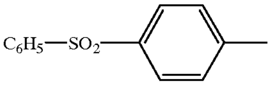,
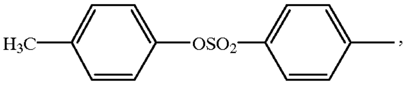,
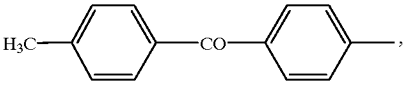,
-continued
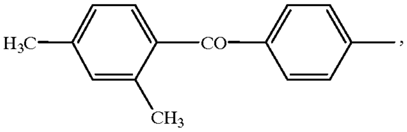,
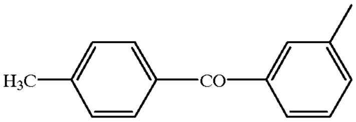,
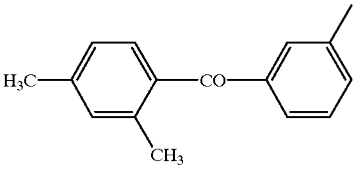,
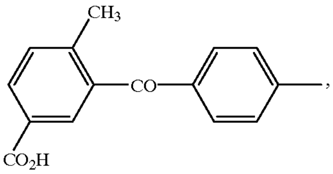,
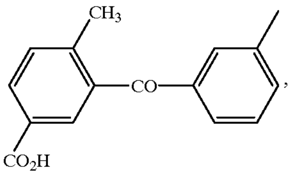,
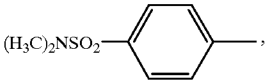,
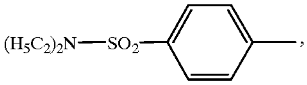,
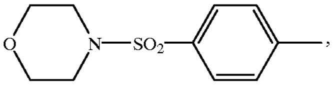,
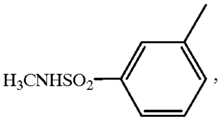,
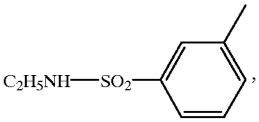,
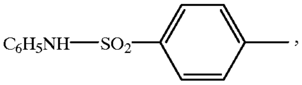,
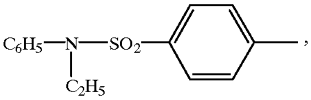,
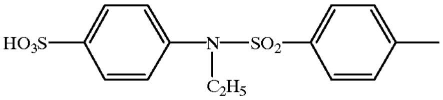, -continued

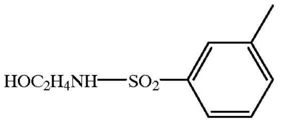,

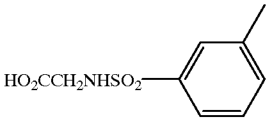,

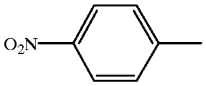,

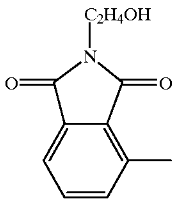,

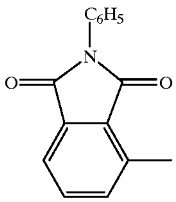,

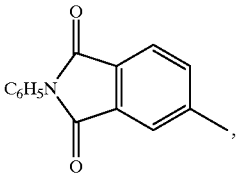,

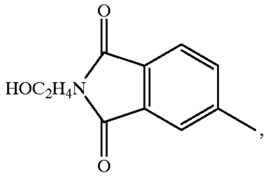,

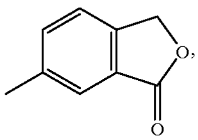,

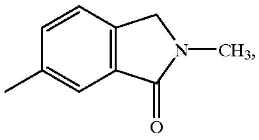,

-continued

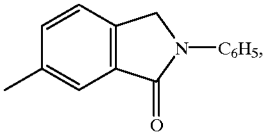,

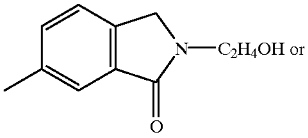 or

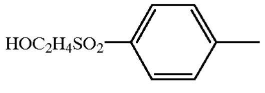.

Since the dyes of the formulae I, II und III contain a plurality of hydroxysulfonyl groups, their salts are encompassed by the invention as well.

Suitable salts include metal or ammonium salts. Metal salts are in particular lithium, sodium and potassium salts. Ammonium salts for the purposes of this invention are salts with substituted or unsubstituted ammonium cations. Examples of substituted ammonium cations are monoalkyl-, dialkyl-, trialkyl-, tetraalkyl- or benzyltrialkyl-ammonium cations or cations derived from nitrogenous five- or six-membered saturated heterocycles, such as pyrrolidinium, piperidinium, morpholinium or piperazinium cations or their N-monoalkyl- or N,N-dialkyl-substituted products. Alkyl is herein to be understood as generally meaning straight-chain or branched $C_1$–$_{20}$-alkyl which may be substituted by one or two hydroxyl groups and/or interrupted by from one to four oxygen atoms in ether function.

These salts are also applicable when the dyes of the formulae I, II and III contain the group

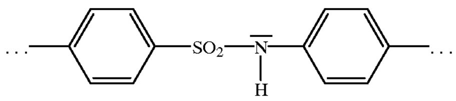

in salt form.

The salts are preferably lithium, sodium or potassium salts.

Preferred mixing partners are disazo dyes of the formula IIa (IIa)

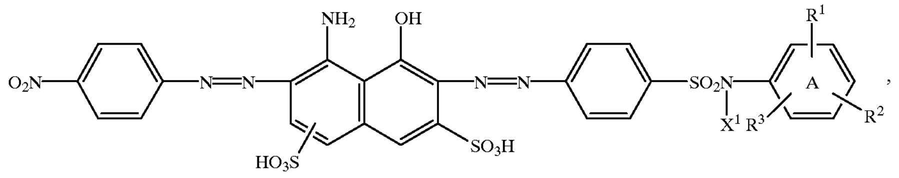

where the ring A, $X^1$, $R^1$, $R^2$ and $R^3$ are each as defined above.

Further preferred mixing partners are disazo dyes of the formula IIb (IIb)

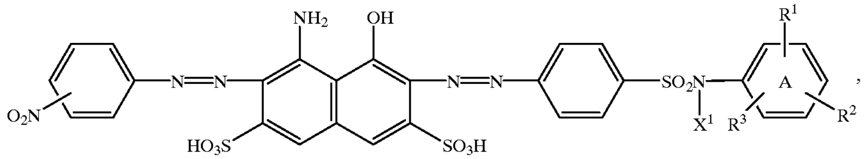

where the ring A, $X^1$, $R^1$, $R^2$ and $R^3$ are each as defined above.

Further preferred mixing partners are disazo dyes of formula II where $R^1$ is hydrogen, methyl, carboxyl, $C_1$- or $C_2$-alkoxycarbonyl or hydroxysulfonyl.

Further preferred mixing partners are disazo dyes of the formula II where $R^2$ is hydrogen, methyl, carboxyl or $C_1$- or $C_2$-alkoxycarbonyl.

Further preferred mixing partners are disazo dyes of the formula II where $R^3$ is hydrogen or hydroxyl.

Further preferred mixing partners are disazo dyes of the formula II where the ring A is not benzofused.

Further preferred mixing partners are disazo dyes of the formula II where at least one of $R^1$, $R^2$ and $R^3$ is not hydrogen.

Further preferred mixing partners are disazo dyes of the formula II where $X^1$ is hydrogen.

Particularly preferred mixing partners are disazo dyes of the formula II where $R^3$ is hydroxyl.

Very particularly preferred mixing partners are disazo dyes of the formula II where $R^1$ and $R^2$ are each hydrogen and $R^3$ is hydroxyl.

Of particular industrial interest for use as mixing partners are disazo dyes conforming to the formula IIc (IIc)

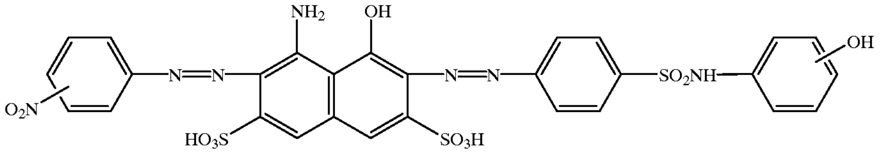

of which the dye of the formula IId (IId)

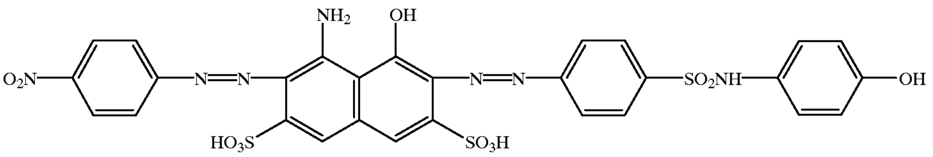

is very particularly emphasized.

Preferred mixing partners are polyazo dyes of the formula IIIa (IIIa)

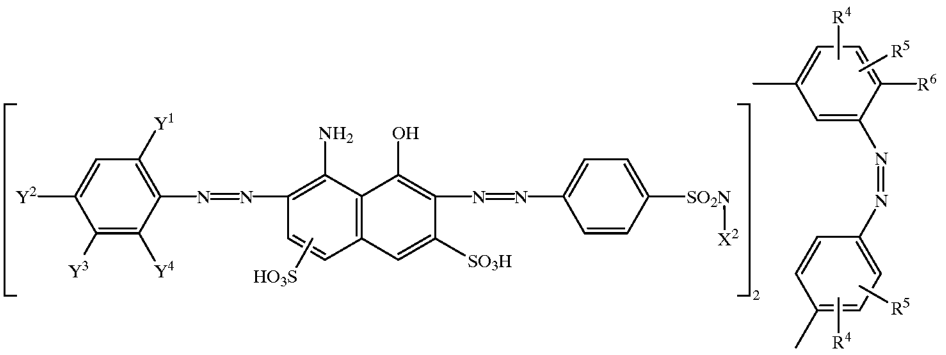

, where $Y^1$, $Y^2$, $Y^3$, $Y^4$, $X^2$, $R^4$, $R^5$ and $R^6$ are each as defined above.

Further preferred mixing partners are polyazo dyes of the formula IIIb (IIIb)

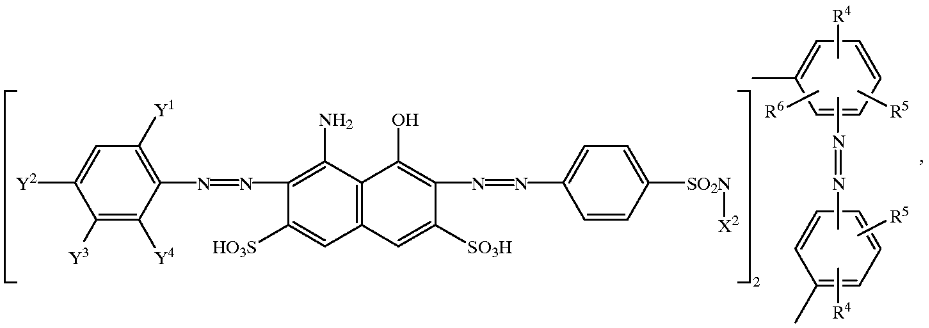

, where $Y^1$, $Y^2$, $Y^3$, $Y^4$, $X^2$, $R^4$, $R^5$ and $R^6$ are each as defined above.

Further preferred mixing partners are polyazo dyes of the formula III where $R^4$ and $R^5$ are each hydrogen.

Further preferred mixing partners are polyazo dyes of the formula III where $R^6$ is hydroxyl.

Further preferred mixing partners are polyazo dyes of the formula III where $Y^1$ is hydrogen, hydroxysulfonyl or a radical of the formula $SO_2$—Ar or 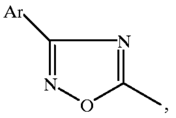, where Ar is in each case as defined above.

Further preferred mixing partners are polyazo dyes of the formula III where $Y^2$ is hydrogen, hydroxysulfonyl, nitro or a radical of the formula $SO_2$—$N(Alk)_2$, $SO_2$—$C_2H_4$—Q or $SO_2$—CH═$CH_2$, where Alk and Q are each as defined above.

Further preferred mixing partners are polyazo dyes of the formula III where $Y^3$ is hydrogen, hydroxysulfonyl or a radical of the formula $SO_2$—$C_2H_4$—Q or $SO_2$—CH═$CH_2$ or $Y^3$ and $Y^2$ are together a radical of the formula $L^2$—$NZ^2$—CO, where $L^2$, Q and $Z^2$ are each as defined above.

Further preferred mixing partners are polyazo dyes of the formula III where $Z^2$ is $C_1$–$C_4$-alkyl, unsubstituted or hydroxyl-substituted, or phenyl.

Particularly preferred mixing partnes are polyazo dyes of the formula III where $X^2$ is hydrogen.

Particularly preferred mixing partners are polyazo dyes of the formula III where $R^6$ is hydroxyl.

Very particularly preferred mixing partners are polyazo dyes of the formula III where $R^4$ and $R^5$ are each hydrogen and $R^6$ is hydroxyl.

Of particular industrial interest for use as mixing partners are polyazo dyes conforming to the formula IIIc (IIIc)

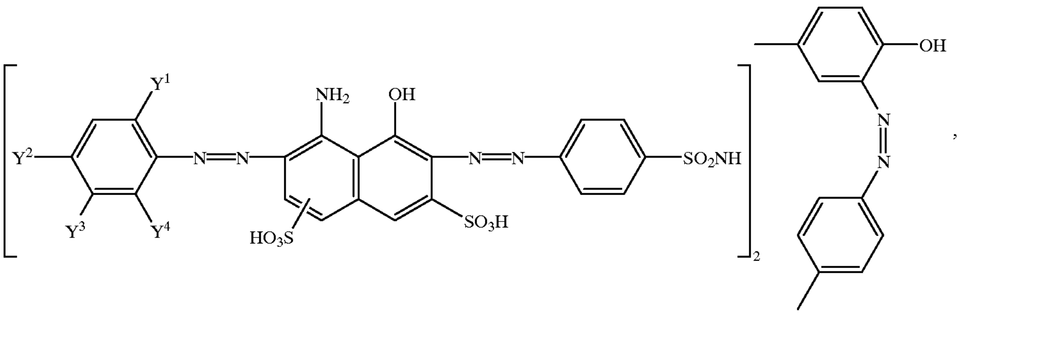

, where $Y^1$, $Y^2$, $Y^3$ and $Y^4$ are each as defined above.

Of particular industrial interest for use as mixing partners are polyazo dyes of the formula IIIa where $Y^2$ is nitro and $Y^1$, $Y^3$ and $Y^4$ are each hydrogen.

Emphasis is given to dye mixtures comprising, based on the weight of the dye mixture, from 19 to 60% by weight, preferably from 29 to 60% by weight, in particular from 29 to 50% by weight, of dye of the formula I, from 30 to 80% by weight, preferably from 39 to 70% by weight, in particular from 49 to 70% by weight, of C.I. Sulphur Black 1 (53 185), from 0.1 to 5% by weight, preferably from 0.2 to 4% by weight, and in particular from 0.5 to 2% by weight, with at least one dye of the formula II and from 0.1 to 5% by weight, preferably from 0.2 to 4% by weight, in particular from 0.5 to 2% by weight, of at least one dye of the formula III, the proportions of the individual components adding to 100% by weight in each case.

Dye formulations may comprise beside the dye mixtures further ingredients, for example

- colorless diluents to achieve a defined color strength, preferably added preground, for example lithium chloride, sodium chloride, potassium chloride, anhydrous sodium sulfate or dextrin, in an amount from 5 to 80% by weight, based on the weight of the dye formulation,
- wetting agents to improve the redispersibility of pulverulent colorants or colorant crusts, such as alkyl sulfosuccinates, dialkyl sulfimides, alkyl phosphates or fatty alcohol alkoxylates, in an amount from 0.1 to 1% by weight, based on the weight of the dye formulation,
- dustproofing agents to minimize dusting in the handling of pulverulent colorant formulations, especially mixtures of an oil component and a suitable emulsifier system, in an amount from 0.1 to 3% by weight, based on the weight of the dye formulation,
- one or more dyes with a brown, red, reddish brown, blue, violet or green hue to achieve a reddish, bluish or greenish black shade, in an amount from 0.1 to 5% by weight, based on the weight of the dye formulation, the proportions of the individual components adding up to 100% by weight in each case.

Examples of dyes with a brown, red, reddish brown, blue, violet or green hue useful for conferring a reddish, bluish, or greenish black shade on the dye mixture are the commercially available dyes C.I. Acid Brown 97, C.I. Acid Red 310, C.I. Acid Red 283, C.I. Acid Red 282, C.I. Acid Blue 254, C.I. Acid Blue 133, C.I. Acid Blue 161 (15 706), C.I. Acid Blue 192, C.I. Acid Blue 193 (15 707), C.I. Acid Blue 134, C.I. Acid Violet 90 (18 762), C.I. Acid Violet 80, C.I. Acid Green 26 or C.I. Acid Green 68:1, which can be employed in the form of the sodium, potassium or lithium salts.

Emphasis is given to dye formulation comprising, based on the weight of the dye formulation, from 10 to 50% by weight, preferably from 10 to 40% by weight, of dye of the formula I, from 15 to 60% by weight, preferably from 15 to 50% by weight, of C.I. Sulphur Black 1 (53 185), from 0.1 to 5% by weight, preferably 40 from 0.2 to 4% by weight, with at least one dye of the formula II, from 0.1 to 5% by weight, preferably from 0.2 to 4% by weight, of at least one dye of the formula III and from 0 to 74.8% by weight, preferably from 0 to 74.6% by weight of further ingredients, the proportions of the individual components adding to 100% by weight in each case.

Of particular interest are dye mixtures comprising the dyes of the formulae I, II and III in such a ratio that, measured at a pH of about 4 in water, the absorption spectrum of the mixture (I, II and III) shows a ratio of the absorption maxima from 464–465 nm:605–606 nm within the range from 1.3:1 to 1.4:1, preferably within the range from 1.36:1 to 1.4:1, especially about 1.38:1.

The novel dye mixtures are obtainable in a conventional manner. For instance, the individual mixing partners can be mixed with one another in the appropriate weight ratios. However, it is also possible to prepare a mixture of the azo dyes of the formulae I, II and III by mixed coupling and then to mix in the dye C.I. Sulphur Black 1 (53 185).

The dye of the formula I is described in U.S. Pat. No. 4,479,906, for example.

The dye C.I. Sulphur Black 1 (53 185) is commercially available.

The dyes of the formulae II and III are known for example from prior patent applications DE-A-1 953 01 76 and DE-A-1 954 87 85.

The dye mixtures of this invention are advantageously useful for dyeing natural or synthetic substrates, for example wool, leather, polyamide or paper (by the inkjet process, too). They are particularly useful for dyeing leather.

The dyeings obtained have a greenish, bluish to reddish black shade and excellent migration and wet fastness properties. Particular emphasis has to be given to the excellent penetration shown by the novel dye mixtures when used for dyeing leather.

The Examples which follow illustrate the invention.

The following dyes were used:

Dye No. 1

Sodium salt of the dye of the formula I

Dye No. 2

Lithium salt of the dye of the formula I

Dye No. 3

Potassium salt of the dye of the formula I

Dye No. 4

Sodium salt of the dye of the formula IId

Dye No. 5

Lithium salt of the dye of the formula IId

Dye No. 6

Potassium salt of the dye of the formula IId

Dye No. 7

Sodium salt of the dye of the formula IIIb 27.3 g of preground anhydrous sodium sulfate and 2 g of commercially available dustproofing agent were mixed together until homogeneous.

The dye mixture dyes leather in a bluish black hue.

(IIId)

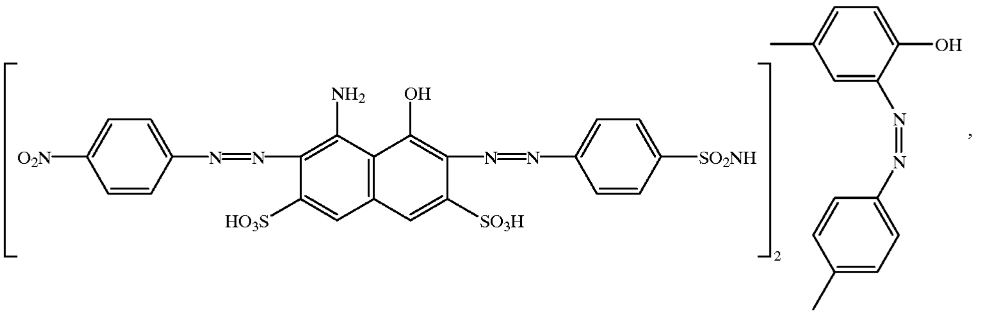

Dye No. 8

Lithium salt of the dye of the formula IIId

Dye No. 9

Potassium salt of the dye of the formula IIId

Dye No. 10

Sodium salt of the dye C.I. Sulphur Black 1 (53 185)

The salts of the dyes Nos. 1 to 9 were obtained by spray drying the respective aqueous solutions.

The salt of the dye No. 10 was obtained by cabinet drying the aqueous solution and subsequent dry grinding.

Dyeing method for side upper leather (parts are by weight)

100 parts of a conventional tanned leather with a shaved thickness of 2.2 mm were neutralized in a drum by drumming for 180 min in 50 parts of water at 40° C. with 2 parts of sodium formate, 0.5 part of sodium bicarbonate and 1 part of sodium acetate and subsequently after addition of 100 parts of water at 30° C. overnight. The leather is then washed in 200 parts of water by drumming for 10 min. Retanning is then carried out in 30 parts of water at 30° C. using 13 parts of a commercially available synthetic tanning agent. After the leather has been drummed in the retanning liquid for 65 min, the dyeing is carried out by adding 2 parts of dye formulation (undissolved) and drumming the leather at 25° C. for 120 min, then adding 150 parts of water and drumming for a further 10 min. After addition of 1 part of concentrated formic acid, the leather is drummed for a further 30 min, and then the liquor is dropped. The leather is then washed by admixing it at 40° C. with 200 parts of water and drumming for 10 min. Thereafter the liquor is again dropped. The fatliquoring is carried out in 100 parts of water at 55° C. by addition of 5 parts of a commercially available fatliquor and drumming for 40 min. After acidification with 1 part of formic acid, the leather is drummed for a further 40 min. Thereafter the leather is rinsed cold, set out, dried, placed in sawdust, staked and dried under reduced pressure.

EXAMPLE 1

35 g of dye No. 10, 35 g of dye No. 1, 0.5 g of dye No. 4, 0.3 g of dye No. 7,

EXAMPLE 2

35 g of dye No. 10, 35 g of dye No. 2, 0.5 g of dye No. 5, 0.5 g of dye No. 8, 27 g of preground anhydrous sodium sulfate and 2 g of commercially available dustproofing agent were mixed together until homogeneous.

The dye mixture dyes leather in a bluish black hue.

EXAMPLE 3

35 g of dye No. 10, 35 g of dye No. 3, 0.5 g of dye No. 6, 0.5 g of dye No. 9, 27 g of preground anhydrous sodium sulfate and 2 g of commercially available dustproofing agent were mixed together until homogeneous.

The dye mixture dyes leather in a bluish black hue.

EXAMPLE 4

35 g of dye No. 10, 32 g of dye No. 1, 0.5 g of dye No. 4

0.5 g of dye No. 7, 3 g of C.I. Acid Red 310, 27 g of preground anhydrous sodium sulfate and 2 g of commercially available dustproofing agent were mixed together until homogeneous.

The dye mixture dyes leather in a reddish black hue.

The dye formulations recited in the table below are prepared and dyed up on side upper leather in a similar manner.

The table specifies the constituents of the mixture and their proportions (in % by weight).

| Ex. No. | Dye No. 10 | Dye of formula I | Dye of formula IId | Dye of formula IIId | Diluent | Dustproofing agent | Shading dye | Hue on leather |
|---|---|---|---|---|---|---|---|---|
| 5 | 35 | 39 (No. 1) | 0.5 (No. 4) | 0.5 (No. 7) | 23 (sodium sulfate) | 2 | — | bluish black |
| 6 | 40 | 15 (No. 1) | 0.5 (No. 4) | 0.5 (No. 7) | 42 (sodium sulfate) | 2 | — | bluish black |
| 7 | 35 | 35 (No. 1) | 0.5 (No. 4) | 0.5 (No. 7) | 27 (sodium sulfate) | 2 | — | bluish black |
| 8 | 35 | 35 (No. 1) | 0.5 (No. 4) | 0.5 (No. 7) | 27 (dextrin) | 2 | — | bluish black |
| 9 | 35 | 32 (No. 1) | 0.5 (No. 4) | 0.5 (No. 7) | 27 (sodium sulfate) | 2 | 3 (C.I. Acid Brown 97) | reddish black |
| 10 | 35 | 30 (No. 1) | 0.5 (No. 4) | 0.5 (No. 7) | 27 (sodium sulfate) | 2 | 5 (C.I. Acid Red 282) | reddish black |
| 11 | 35 | 30 (No. 1) | 0.5 (No. 4) | 0.5 (No. 7) | 27 (sodium sulfate) | 2 | 5 (C.I. Acid Red 283) | reddish black |
| 12 | 30 | 35 (No. 1) | 0.5 (No. 4) | 0.5 (No. 7) | 27 (sodium sulfate) | 2 | 5 (C.I. Acid Blue 254) | bluish black |
| 13 | 35 | 32 (No. 1) | 0.5 (No. 4) | 0.5 (No. 7) | 27 (sodium sulfate) | 2 | 3 (C.I. Acid Blue 133) | bluish black |
| 14 | 35 | 30 (No. 1) | 0.5 (No. 4) | 0.5 (No. 7) | 27 (sodium sulfate) | 2 | 5 (C.I. Acid Blue 161 (15 706)) | bluish black |
| 15 | 33 | 32 (No. 2) | 0.5 (No. 5) | 0.5 (No. 8) | 27 (sodium sulfate) | 2 | 5 (C.I. Acid Blue 192) | bluish black |
| 16 | 35 | 32 (No. 2) | 0.5 (No. 5) | 0.5 (No. 8) | 27 (sodium sulfate) | 2 | 3 (C.I. Acid Blue 192) | bluish black |
| 17 | 35 | 30 (No. 3) | 0.5 (No. 6) | 0.5 (No. 9) | 27 (sodium sulfate) | 2 | 5 (C.I Acid Blue 193 (15 707)) | bluish black |
| 18 | 33 | 32 (No. 3) | 0.5 (No. 6) | 0.5 (No. 9) | 27 (sodium sulfate) | 2 | 5 (C.I. Acid Blue 134 | bluish black |
| 19 | 35 | 32 (No. 1) | 0.5 (No. 4) | 0.5 (No. 7) | 27 (sodium sulfate) | 2 | 3 (C.I. Acid Violet 90 (18 762)) | reddish black |
| 20 | 35 | 32 (No. 1) | 0.5 (No. 4) | 0.5 (No. 7) | 27 (sodium sulfate) | 2 | 3 (C.I. Acid Violet 90 | reddish black |
| 21 | 35 | 32 (No. 2) | 0.5 (No. 5) | 0.5 (No. 8) | 27 (sodium sulfate) | 2 | 3 (C.I. Acid Green 26) | greenish black |
| 22 | 35 | 32 (No. 3) | 0.5 (No. 6) | 0.5 (No. 9) | 27 (sodium sulfate) | 2 | 3 (C.I. Acid Green 68:1) | greenish black |

We claim:

1. Dye mixtures comprising the dye of the formula I (I)

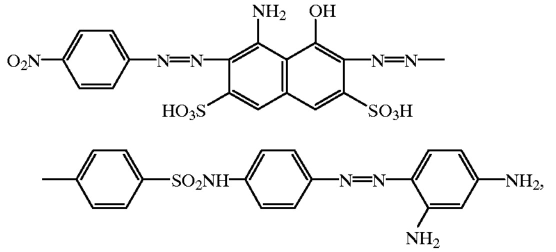

the dye C.I. Sulphur Black 1 (53 185), at least one disazo dye of the formula II (II)

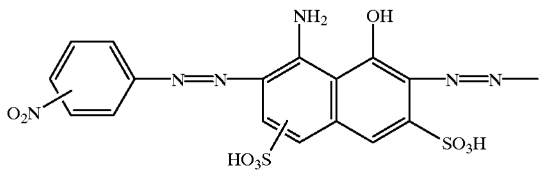

-continued

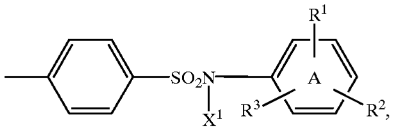

where ring A may be benzofused, $X^1$ is hydrogen or $C_1$–$C_4$-alkyl, $R^1$ is hydrogen, $C_1$–$C_4$-alkyl, halogen, carboxyl, $C_1$–$C_4$-alkoxycarbonyl or hydroxysulfonyl, $R^2$ is hydrogen, $C_1$–$C_4$-alkyl, halogen, carboxyl or $C_1$–$C_4$-alkoxycarbonyl, or $R^1$ and $R^2$ are together a radical of the formula $L^1$—$NZ^1$—CO, where $L^1$ is methylene or carbonyl and $Z^1$ is $C_1$–$C_4$-alkyl, unsubstituted or $C_1$–$C_4$-alkoxy-substituted, or unsubstituted or $C_1$–$C_4$-alkyl- or $C_1$–$C_4$-alkoxy-substituted phenyl, and $R^3$ is hydrogen, $C_1$–$C_4$-alkyl, hydroxyl, $C_1$–$C_4$-alkoxy, phenoxy, $C_1$–$C_4$-alkanoyloxy or benzoyloxy, and at least one polyazo dye of the formula III (III)

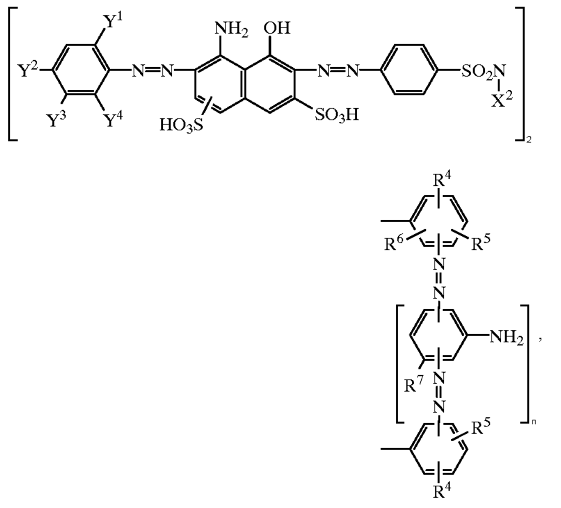

where n is 0 or 1, $Y^1$ is hydrogen, hydroxysulfonyl, pyrrolidinylsulfonyl, piperidinylsulfonyl, morpholinylsulfonyl or a radical of formula $SO_2$-Alk, $SO_2$—Ar, $SO_2$—N(Alk)$_2$, $SO_2$—N(Alk)Ar, $SO_2$—OAr, $SO_2$—$C_2H_4$—Q, $SO_2$—CH=$CH_2$, $SO_2$—$CH_2$CH=$CH_2$, CO—Ar,

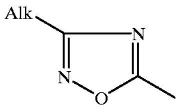

or

-continued

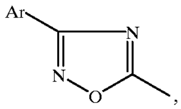

, $Y^2$ is nitro, a radical of the formula $SO_2$—NHAr or the radical $Y^1$, $Y^3$ is hydrogen, hydroxysulfonyl, pyrrolidinylsulfonyl, piperidinylsulfonyl, morpholinylsulfonyl or a radical of formula $SO_2$-Alk, $SO_2$—N(Alk)$_2$, $SO_2$—NHAlk, $SO_2$—$CH_2$COOH, $SO_2$—$C_2H_4$—Q, $SO_2$—CH=$CH_2$, $SO_2$—$CH_2$CH=$CH_2$, CO—Ar or CO—NHAlk or $Y^3$ and $Y^2$ are together a radical of formula $L^2$—$NZ^2$—CO or $L^2$—O—CO, $Y^4$ is hydrogen, or $Y^4$ and $Y^3$ are together a radical of formula $L^2$—$NZ^2$—CO, $X^2$ is hydrogen or $C_1$–$C_4$-alkyl, $R^4$ is hydrogen, $C_1$–$C_4$-alkyl, halogen, carboxyl, $C_1$–$C_4$-alkoxycarbonyl or hydroxysulfonyl, $R^5$ is hydrogen, $C_1$–$C_4$-alkyl, halogen, carboxyl or $C_1$–$C_4$-alkoxycarbonyl or $R^2$ and $R^1$ are together a radical of formula $L^2$—$NZ^2$—CO, $R^6$ is hydrogen, hydroxyl, $C_1$–$C_4$-alkoxy, $C_1$–$C_4$-alkanoyloxy or benzoyloxy, $R^7$ is hydrogen, amino or hydroxyl, Alk is $C_1$–$C_8$-alkyl, with or without interruption by from one to three oxygen atoms in ether function or by a sulfur atom or by a sulfonyl group and with or without substitution by hydroxyl, $C_1$–$C_4$-alkanoyloxy, benzoyloxy, sulfato, halogen, cyano, carboxyl or phenyl, Ar is phenyl, which is unsubstituted or substituted by $C_1$–$C_4$-alkyl, $C_1$–$C_4$-alkoxy, halogen, carboxyl, $C_1$–$C_4$-alkanoylamino or hydroxysulfonyl, $L^2$ is methylene or carbonyl, $Z^2$ is hydrogen, naphthyl, $C_5$–$_8$-cycloalkyl or a radical of the formula Alk or Ar and Q is hydroxyl or an alkali-detachable group.

2. Dye mixtures as claimed in claim 1, comprising disazo dyes conforming to the formula IIa (IIa)

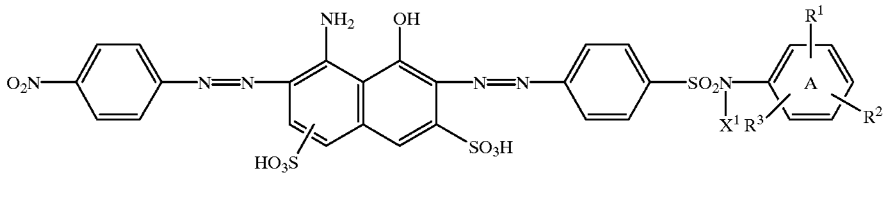

where the ring A, $X^1$, $R^1$, $R^2$ and $R^3$ are each as defined in claim 1.

3. Dye mixtures as claimed in claim 1, comprising disazo dyes conforming to the formula IIb (IIb)

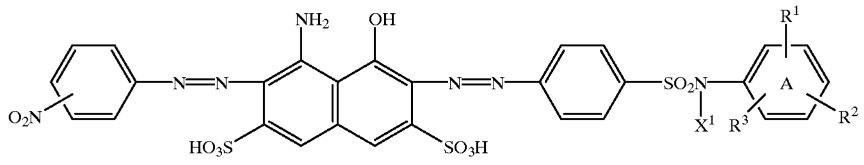

where the ring A, $X^1$, $R^1$, $R^2$ and $R^3$ are each as defined in claim 1.

4. Dye mixtures as claimed in claim 1, comprising polyazo dyes conforming to the formula IIIa (IIIa)

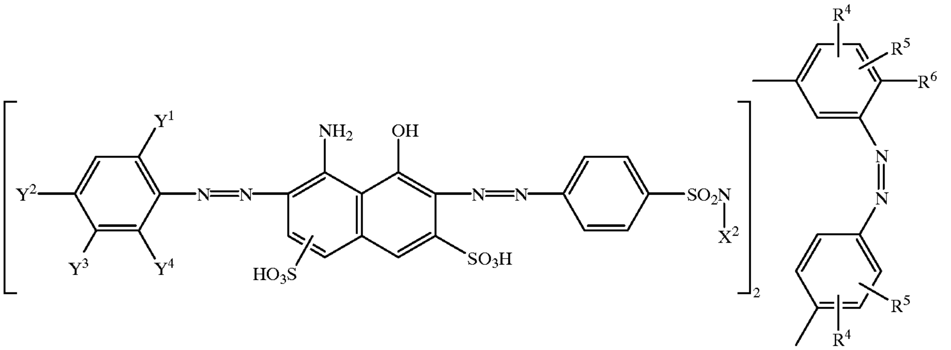

where $Y^1$, $Y^2$, $Y^3$, $Y^4$, $X^2$, $R^4$, $R^5$ and $R^6$ are each as defined in claim 1.

5. Dye mixtures as claimed in claim 1, comprising polyazo dyes conforming to the formula IIIb (IIIb)

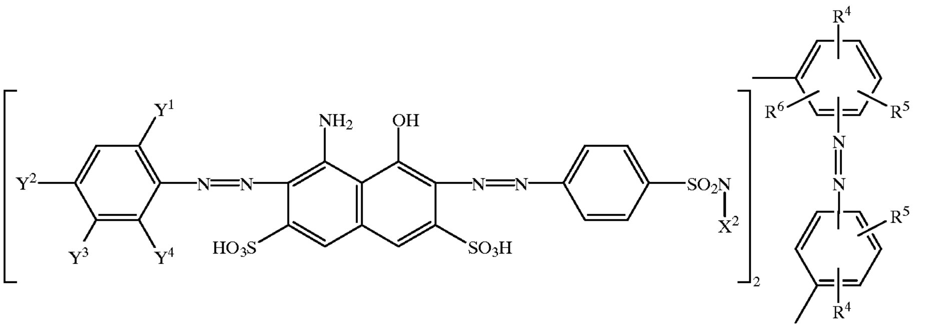

where $Y^1$, $Y^2$, $Y^3$, $Y^4$, $X^2$, $R^4$, $R^5$ and $R^6$ are each as defined in claim 1.

6. Dye mixtures as claimed in claim 1, comprising, based on the weight of the dye mixture, from 19 to 60% by weight of dye I, from 30 to 80% of C.I. Sulphur Black 1 (53 185), from 0.1 to 5% by weight of at least one dye of the formula II and from 0.1 to 5% by weight of at least one dye of the formula III.

7. A method for dyeing natural or sythetic substrates which comprises applying to said substrates a dye mixture according to claim 1.

* * * * *